US006434390B2

(12) United States Patent
Rahman

(10) Patent No.: US 6,434,390 B2
(45) Date of Patent: Aug. 13, 2002

(54) MACRODIVERSITY CONTROL SYSTEM HAVING MACRODIVERSITY MODE BASED ON OPERATING CATEGORY OF WIRELESS UNIT

(75) Inventor: Mohamed Anisur Rahman, Randolph, NJ (US)

(73) Assignee: Lucent Technologies Inc., Murray Hil, NJ (US)

(*) Notice: Subject to any disclaimer, the term of this patent is extended or adjusted under 35 U.S.C. 154(b) by 0 days.

(21) Appl. No.: 09/324,177

(22) Filed: Jun. 3, 1999

(51) Int. Cl.[7] ................................................. H04Q 7/20
(52) U.S. Cl. ..................... 455/440; 455/436; 455/439; 370/332
(58) Field of Search ............................... 455/440, 444, 455/443, 436, 437, 438, 439, 463, 464, 525; 370/331, 332, 333

(56) References Cited

U.S. PATENT DOCUMENTS

| | | | | |
|---|---|---|---|---|
| 5,701,585 A | * | 12/1997 | Kallin et al. ................. | 455/437 |
| 5,737,702 A | * | 4/1998 | Madhavapeddy et al. ... | 455/422 |
| 5,765,103 A | * | 6/1998 | Chang et al. ................. | 455/440 |
| 5,905,950 A | * | 5/1999 | Anell ........................... | 455/437 |
| 5,913,166 A | * | 6/1999 | Buttitta et al. ............... | 455/444 |
| 5,920,808 A | * | 7/1999 | Frodigh et al. .............. | 455/444 |
| 5,930,712 A | * | 7/1999 | Byrne et al. ................. | 455/437 |
| 6,073,010 A | * | 6/2000 | Dufour ......................... | 455/422 |
| 6,078,817 A | * | 6/2000 | Rahman ....................... | 455/442 |
| 2001/0041569 A1 | * | 11/2001 | Rahman ....................... | 455/436 |

FOREIGN PATENT DOCUMENTS

| | | | |
|---|---|---|---|
| WO | 9634500 | 10/1996 | ............ H04Q/7/20 |
| WO | 9858515 | 12/1998 | ............ H04Q/7/38 |

OTHER PUBLICATIONS

Barberis S. et al. "Performance Evaluation of a DS–CDMA System in Indoor Environment with Macrodiversity" Proceedings of the Conference on Communications (ICC), US, NY IEEE, Jun. 18, 1995, p.p. 720–724.

* cited by examiner

Primary Examiner—Rafael Perez-Gutierrez
(74) Attorney, Agent, or Firm—Harness, Dickey & Pierce, PLC

(57) ABSTRACT

A macrodiversity control system provides a wireless unit with a macrodiversity mode depending on the operating category of the wireless unit. For example, a wireless communications system can have wireless units operating in categories related to the mobility of the wireless unit, such as fixed, limited fixed (mobility within the home cell) and/or fully mobile. For a wireless unit, the macrodiversity mode of the wireless unit can be established depending on the operating category for the wireless unit. Where the wireless unit is fixed and has good reception from a home base station, particularly in regions close to the home base station, macrodiversity for the wireless unit can be restricted. Because the mobility of the wireless unit is restricted in the fixed (or limited fixed) mode, the fading of signals between the home base station and the wireless unit should not be severe, thereby macrodiversity is disabled. Where the reception is poor, particularly in a region near the edge of the cell, the macrodiversity for the fixed (or limited fixed) wireless unit is enabled. The fixed (or limited fixed) wireless unit at the edge of the cell can benefit from macrodiversity, but because the wireless unit is fixed (or limited fixed), the fixed (or limited fixed) wireless unit is not handed off to another base station (or can only be handed off to a limited set of base stations).

16 Claims, 3 Drawing Sheets

MACRODIVERSITY CONTROL SYSTEM HAVING MACRODIVERSITY MODE BASED ON OPERATING CATEGORY OF WIRELESS UNIT

BACKGROUND OF THE INVENTION

1. Field of The Invention

This invention relates to wireless communications, and, more particularly, to a cellular communications system with wireless units of different operating categories.

2. Description of Related Art

FIG. 1 depicts a diagram of a portion of a typical wireless communications system 10, which provides wireless communications service to a number of wireless or mobile units 12a–c, that are situated within a geographic region. The geographic region serviced by a wireless communications system is divided into spatially distinct areas called "cells." Each cell is schematically represented by one hexagon in a honeycomb pattern; in practice, however, each cell has an irregular shape that depends on the topography of the terrain surrounding the cell and other factors. A conventional cellular telephone system comprises a number of cell sites or base stations 14a–d, geographically distributed to support transmission and receipt of voice-based communication signals to and from cellular telephones, often referred to as mobile units or wireless units. Each cell site handles voice communications over a cell, and the overall coverage area for the cellular telephone system is defined by the union of cells for all of the cell sites, where the coverage areas for nearby cell sites overlap to some degree to ensure (if possible) contiguous communications coverage within the outer boundaries of the system's coverage area. One cell site may sometimes provide coverage for several sectors. In this specification, cells and sectors are referred to interchangeably.

A base station 14a–d comprises the radios and antennas that the base station uses to communicate with the mobile units in that cell and also comprises the transmission equipment that the base station uses to communicate with a Mobile Switching Center (MSC) 16. The Mobile Switching Center 16 is responsible for, among other things, establishing and maintaining calls between the mobile units and calls between a mobile unit and a wireline unit (e.g., wireline unit 18), which wireline unit 18 is connected to the Mobile Switching Center (MSC) 16 via a public switched telephone network (PSTN) 20. The Mobile Switching Center 16 is connected to a plurality of base stations, such as base stations 14a–d, that are dispersed throughout the geographic region serviced by the MSC 16 and to the PSTN 20 and/or a packet data network (PDN) 22, such as the Internet. The MSC 16 is connected to several databases, including a home location register (HLR) 24. The HLR 24 contains subscriber information and location information for all mobile units which reside in the geographic region of the MSC 16. Typically, for each of the mobile units, the HLR 24 stores a mobile identification number (MIN) or International Mobile Subscriber Identification Number (IMSI), the mobile directory or phone number (MDN), and/or an electronic serial number (ESN).

When active, a mobile unit receives forward-link signals from and transmits reverse-link signals to (at least) one cell site or base station. Each active mobile unit is assigned a forward link on which it receives its forward-link signals on at least one forward link channel and a reverse link on which it transmits reverse link signals on at least one reverse link channel. There are many different schemes for defining forward and reverse link channels for a cellular telephone system, including TDMA (time-division multiple access), FDMA (frequency-division multiple access), and CDMA (code-division multiple access) schemes. In CDMA communications, different channels are distinguished by different spreading sequences that are used to encode different voice-based streams, which may then be modulated at one or more different carrier frequencies for simultaneous transmission. A receiver can recover a particular voice-based stream from a received signal using the appropriate spreading sequence to decode the received signal.

In order to avoid interference between signals transmitted to and from mobile units in a CDMA system, all active mobile units within a particular cell are assigned different CDMA spreading sequences. Since cellular telephone systems are dynamic systems in which mobile units become active and inactive at different (and possibly random) times and since mobile units can move from one cell to another, the assignment of channels to the various mobile units is made by the cellular system in real time. In order to assign bandwidth resources to mobile units so as to avoid interference between mobile units in neighboring cells, the resource-assignment activities of neighboring cell sites are coordinated.

A detailed sequence of activities are typically followed before the mobile unit can access the wireless communications system to establish or receive a call. As is known in the art, calls between a CDMA mobile unit and a base station typically employ several kinds of channels. Initially, a pilot channel is employed to continually broadcast certain system synchronization and timing information to all mobile units in an area. After initial synchronization is achieved at a mobile unit, a sync channel is used to establish more specific time and frame synchronization at the mobile unit. The sync channel message also provides information about another class of channels, the paging channels. Paging channels are used to broadcast a variety of control information, including access channel information, contained in the access parameter message. This access parameter message contains parameters and other information of interest to mobile units seeking access to the base station. Other overhead messages are sent between the mobile unit and the base station to facilitate communications over forward and reverse link traffic channels between the mobile unit and the base station over which voice and/or data information is transmitted.

Conventional CDMA systems being developed use macrodiversity to improve the performance or quality of reception. The macrodiversity concept as is used in CDMA involves two or more simultaneous links from two or more base stations. The mobile and cell receivers employ a number of parallel correlators. Receivers using parallel correlators (sometimes called RAKE receivers) allow individual path arrivals to be tracked independently and the sum of their received signal strengths is then, used to demodulate the signal. While there is fading on each arrival, the fades are independent. Demodulation based on the sum of the signals is then much more reliable. However, this process may use a lot of the resources/equipment of a cell site. Moreover, it is expected that quite a high percentage of the calls will use macrodiversity.

Once a system is designed, the number of transceiver elements are fixed, and as the number of users increase, macrodiversity will consume the wireless resources. For the macrodiversity to operate, the mobile unit searches for pilot signals of base stations on a candidate list which are not currently servicing the wireless unit. The wireless unit measures the signal strengths, for example using a received signal strength indicator (RSSI) of the pilot signals. When the wireless unit detects a pilot of sufficient strength which is associated with a base station not assigned to the wireless unit, a pilot measurement message including the pilot signal measurements is provided to the MSC 16. Using the pilot signal measurements, the MSC 16 determines whether to assign a traffic channel from another base station to the wireless unit. The wireless unit is said to be in macrodiversity state if it is assigned traffic channels from more than one base station. Within the geographic region, the MSC 16 switches calls from one base station to another in real time as the mobile unit moves between cells, referred to as call handoff.

All base stations connected to a given wireless unit define the active set of that mobile unit, and an active set update function controls, i.e, evaluates and updates, this active set based on pilot strength measurements. At the wireless unit, the strongest pilots are detected and measured by the measurement process. The signal strength values are then collected into the pilot measurement report, which is sent to the MSC 16. When the active set update function is invoked, the base stations within the active set from which the strongest and weakest pilot are received are identified. If the difference is greater than the system desired value (called active set window thereafter), the weakest base station will be removed from the active set. A base station is added to the active set window if the received pilot signal strength is within the window and above an active set threshold value, provided the active set size (no. of RAKE fingers in the receiver) is not exceeded. If the active set size is full, the weakest base station in the active set will be replaced by the new base station if the corresponding pilot signal strength is higher than the weakest base station.

Some wireless cellular communications systems involve fixed wireless units. The fixed cellular concept is getting a lot of attention and is a substitute for the public switched telephone network (PSTN), where the terrain is difficult and the infrastructure cost is too high to implement the PSTN. The fixed cellular concept involves wireless units where the mobility of the wireless unit is very limited within the home cell (limited or no mobility at all). Macrodiversity is not normally used and no handoffs are allowed between the base stations.

Macrodiversity as used in the CDMA system has the advantage that it improves the quality of reception in the cellular or PCS system, but if the cellsite is fully loaded (all the transceivers are being used), the capacity of the system suffers. Thus, macrodiversity needs to be coordinated, especially in a system using both fixed and mobile units, to more efficiently use the resources of the wireless communications system.

SUMMARY OF THE INVENTION

The present invention involves a macrodiversity control system, for a wireless communication system, which provides a wireless unit using a macrodiversity mode depending on the operating category of the wireless unit. For example, a wireless communications system can have wireless units operating in categories related to the mobility of the wireless unit, such as fixed, limited fixed (mobility within the home cell) and/or fully mobile. For a wireless unit, the macrodiversity mode of the wireless unit can be established depending on the operating category for the wireless unit. Where the wireless unit is fixed and has good reception from a home base station, particularly in regions close to the home base station, macrodiversity for the wireless unit can be restricted. Because the mobility of the wireless unit is restricted in the fixed (or limited fixed) mode, the fading of signals between the home base station and the wireless unit should not be severe, thereby macrodiversity is disabled. Where the reception is poor, particularly in a region near the edge of the cell, the macrodiversity for the fixed (or limited fixed) wireless unit is enabled. The fixed (or limited fixed) wireless unit at the edge of the cell can benefit from macrodiversity, but because the wireless unit is fixed (or limited fixed), the fixed (or limited fixed) wireless unit is not handed off to another base station (or can only be handed off to a limited set of base stations).

BRIEF DESCRIPTION OF THE DRAWINGS

Other aspects and advantages of the present invention may become apparent upon reading the following detailed description and upon reference to the drawings in which.

DETAILED DESCRIPTION

Figure 2:
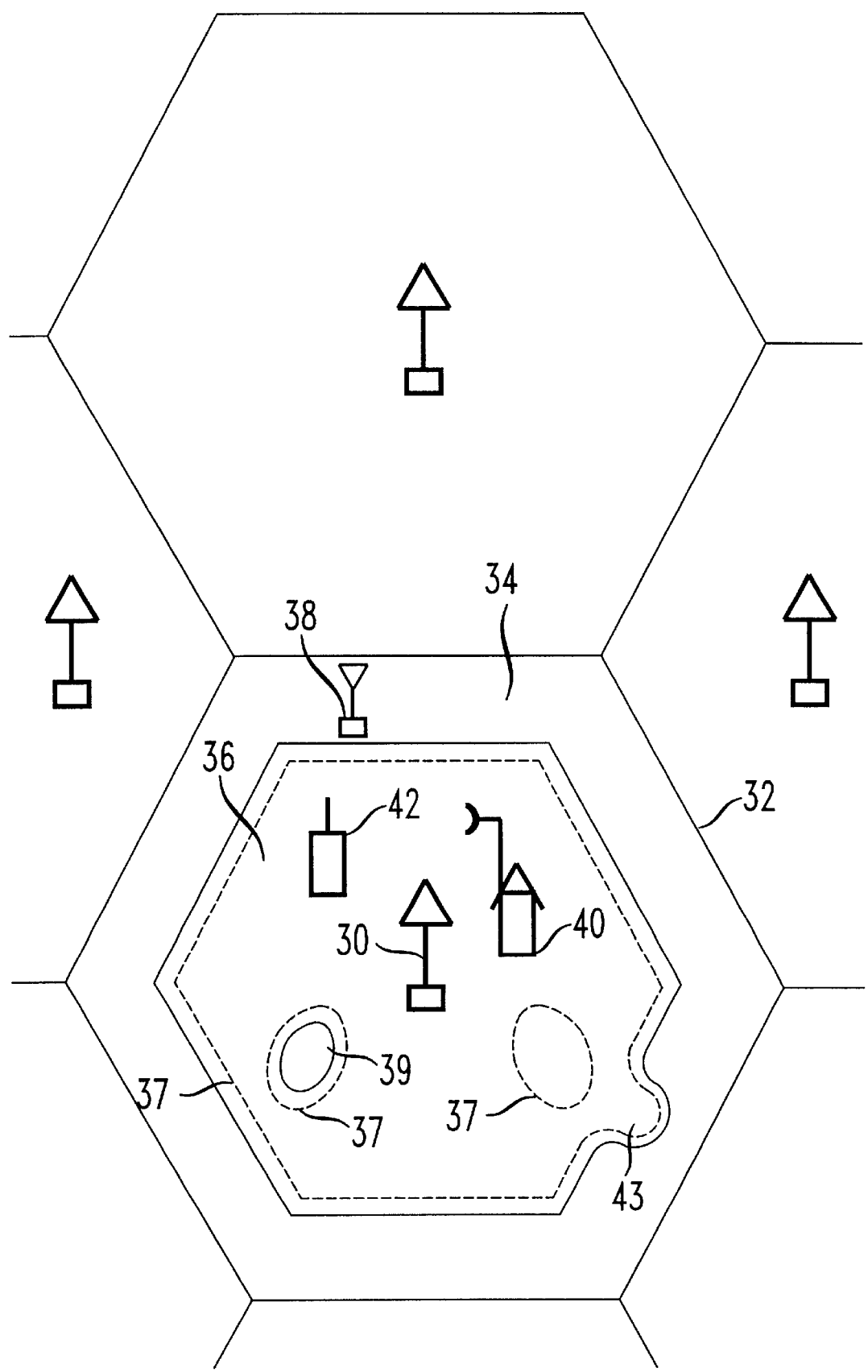
FIG. 2 shows a diagram of a cellular system using the principles of the present invention.

Illustrative embodiments of the macrodiversity/handoff control system ("macrodiversity control system") are described with respect to a cellular system of wireless units having different operating categories, such as fixed (no mobility), limited fixed (limited fixed mobility within the home cell) and/or fully mobile wireless units. In some embodiments, the wireless unit can switch between fixed, limited fixed and/or mobile categories. FIG. 2 shows a base station 30 for a cell 32. For illustrative purposes, the cell 32 is shown with a macrodiversity region 34 and a non-macrodiversity region 36 for wireless units in the fixed category. In the fixed operating category, wireless units can be rigidly fixed, such as a wireless unit 40 with an antenna on the roof directed towards the base station. In such a case, the antenna has a fairly high height gain, and the directional antenna helps reception. Since the position of the antenna is known, the macrodiversity/handoff mode or operation of the wireless unit can be established and set during installation/RF optimization by adjusting the antenna position or direction.

In some embodiments, a limited fixed operating category can be established where mobility is restricted (for example, a limited fixed wireless unit may be limited to walking speed because the wireless unit is in a home or premises), as such the fading scenarios are not as severe as a fully mobile wireless unit. For the limited fixed category, wireless units can operate using a different macrodiversity mode or operation than the mode used by the fixed wireless units. For example, a dashed line 37 can designate a boundary between the macrodiversity and non-macrodiversity regions for the limited fixed category. The different macrodiversity regions can be defined by macrodiversity triggering values used by the macrodiversity control system in comparisons with signal quality measurements, such as the signal strength measurements of the forward and/or reverse traffic or pilot channels to determine the macrodiversity mode for the wireless unit. In alternative embodiments, the macrodiversitry/handoff operation for a particular wireless unit is determined by individual macrodiversity trigger values and/or handoff threshold values for the particular wireless unit. The operating category for the wireless unit can be the basis for establishing the macrodiversity/handoff operation for the wireless unit.

The macrodiversity mode for the wireless unit can be established at subscription or installation/RF optimization and maintained, or in some embodiments, the macrodiversity/handoff mode of the wireless unit can be changed, for example based on a change in operating category or a change by the system in how the macrodiversity modes for particular operating categories, particular mobiles, particular cells or the system are defined. Furthermore, the macrodiversity mode of the wireless unit can be determined using certain operating parameter(s), such as signal quality measurements of signal to and/or from the base station and/or the traffic load of the cell and/or surrounding cells. Prior traffic patterns and/or prior handoff or macrodiversity characteristics for the wireless unit can also be used to determine the macrodiversity operation for the wireless unit. For example, the wireless unit can be in a macrodiversity region in the summer and a non-macrodiversity region in the winter. Depending on the embodiment, the boundary 37 can change.

In the macrodiversity region 34, a fixed wireless unit 38 has macrodiversity enabled because the reception from the base station 30 is poor, for example below a fixed macrodiversity trigger value, such as a signal quality value measured by signal strength, signal to noise ratio (such as Ec/Io), bit error rate (BER), and/or frame error rate (FER). The macrodiversity region 34 is typically at the edge of the cell 32 or in a hand off region, but can be extended for a wireless unit with poor reception due to location or other interference scenarios (although physically close to the base station 30 such as area 39). When macrodiversity is enabled, the wireless unit 38 can receive signals from the base stations of other cells to improve reception, but the wireless unit 38 will not be handed off to the other cells when in a fixed operating category. In certain embodiments, the fixed wireless unit can use macrodiversity without being handed off to another cell by blocking or bypassing the handoff procedure, for example by blocking a hand off parameter measurement request message and/or a hand off direction message for the fixed wireless unit 38 used in a typical system to initiate a handoff.

Alternatively, handoff parameter values or thresholds used to initiate handoff procedures in comparison with signal quality measurements of received signals from the serving and/or other base stations can be set on a per wireless unit basis to prevent the wireless unit from being handed off and/or to be handed off only under limited conditions, such as when the wireless unit is in a limited fixed mode and receiving signals below a threshold value different from the threshold value determining a handoff for a mobile wireless unit. In such a scenario, a restricted list of candidate base stations can be examined for macrodiversity and/or handoffs, and the active set could be limited when compared to a fully mobile wireless unit. Another parameter to determine whether a fixed (or limited fixed) wireless unit can enable macrodiversity and/or handoffs is the load on the cell 32 and/or of the surrounding cells. For example, when the traffic load is below a threshold, macrodiversity and/or handoffs can be enabled by setting the active set threshold values and/or handoff related parameters to enable macrodiversity and/or handoffs.

A fixed (or limited fixed) wireless unit 40 or 42 has macrodiversity disabled in a non-macrodiversity region 36 where the reception is good from the serving base station 30, for example above a fixed (or limited fixed) macrodiversity threshold value, such as a signal quality measurement value of a signal from the serving base station 30, for example a measurement of signal strength, frame error rate (FER), or bit error rate (BER). Such a non-macrodiversity region 36 is typically close to the base station 30 but can be extended to areas, such as area 43, where the wireless unit has good reception although located close to the edge of the cell. By properly coordinating the macrodiversity region (where macrodiversity between different cells and sites are allowed as shown in FIG. 2), wireless resources can be used more efficiently. Establishing the wireless unit 40 or 42 as fixed and operating with macrodiversity disabled saves wireless system resources, such as traffic channels which would be used for macrodiversity as well as resources required in registering wireless units with other base stations. Additionally, the interference in the wireless system is reduced due to the avoidance of multiple base stations transmitting the same information. Even if macrodiversity is enabled, active set threshold values, a restricted or limited active set(s) and/or other macrodiversity/handoff parameters could be used for macrodiversity while handoffs are prevented (or limited).

In certain embodiments, a wireless unit 40 or 42 can be designated as fixed and assigned a home cell 32 where calls are to be originated. When the wireless unit 40 or 42 attempts to gain access to the wireless system, the macrodiversity control system can retrieve a home cell identification corresponding to the wireless unit 40 or 42. The home cell identification can be retrieved from the home location register 24 FIG. 1) of the MSC 16 (FIG. 1) and/or from the wireless unit. If access is attempted by the wireless unit 40 or 42 (in the fixed or limited fixed mode) at some other base station 30, the system can respond with a directed retry message. The base station 30 can send a directed retry message to instruct the wireless unit that service is not supported in the cell where access was attempted and try access elsewhere or with different operating category or parameters. The system could simply deny access to the wireless unit, or change the operating category of the wireless unit from fixed or limited fixed to mobile.

In a wireless system with fixed (no mobility at all), limited fixed (mobility within the home cell) and fully mobile units, the wireless units can be designated at subscription as fixed or limited fixed within the home cell. As such, the fixed or limited fixed wireless units will not have to register with the base station 30. Registration is the process by which the wireless unit notifies the base station of its location and identification so that the base station can page the base station when establishing a wireless terminated call. For example, in American National Standards (ANSI) J-STD-008 dated Mar. 24, 1995 entitled Personal Station-Base Station Compatibility Requirements for 1.8 to 2.0 GHz Code Division Multiple Access (CDMA) Personal Communications Systems (ANSI J-STD-008), various forms of registration are described. Fixed (or limited fixed) wireless units will always be registered with the same home cell, thereby relieving the wireless system of registration-related processing which is very significant in a cellular environment. For the wireless units designated as fully mobile, the registration should be handled and processed as described in current standards, such as ANSI J-STD-008.

Figure 1:
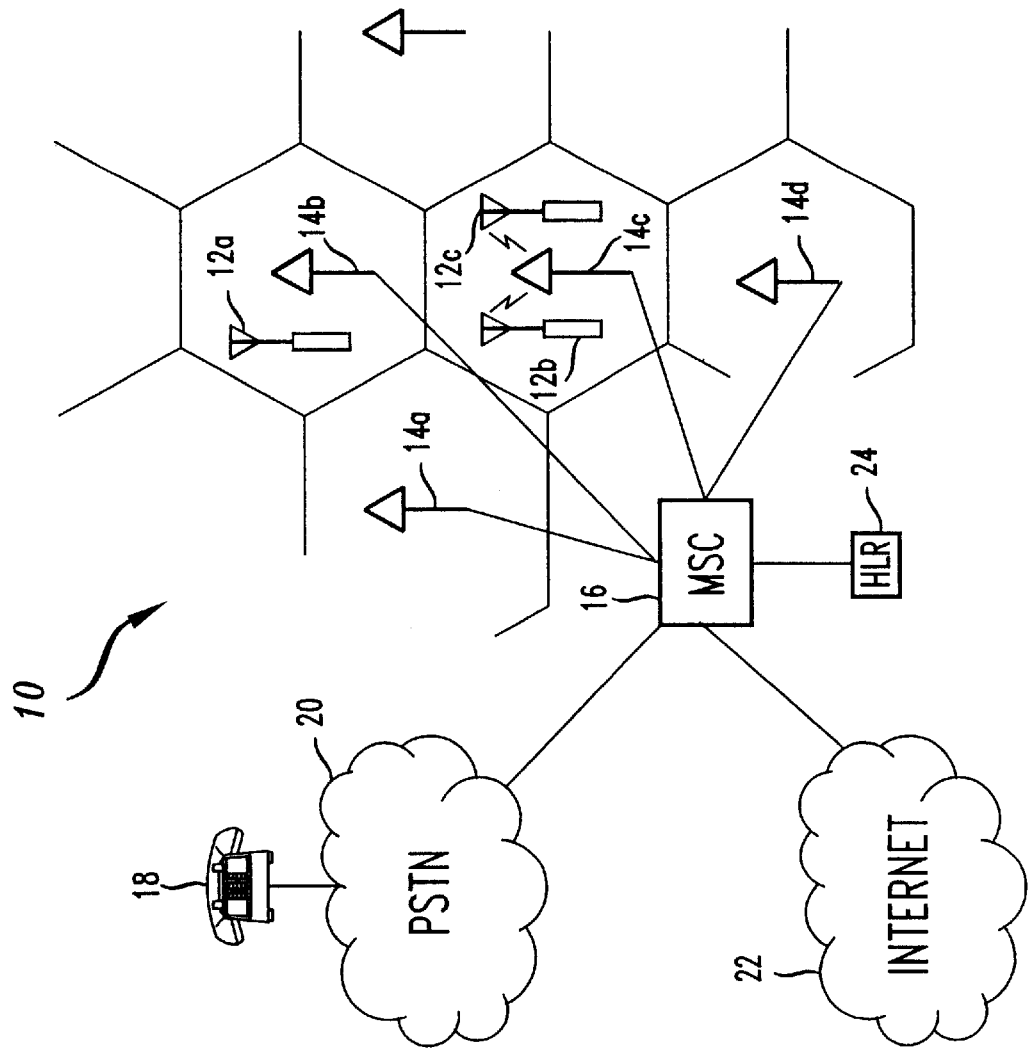
FIG. 1 shows a general diagram of a cellular communications system in which the wireless communications system according to the principles of the present invention can be used.

As such, the fixed (or limited fixed) wireless unit can be charged at a discount rate because the fixed units will need less system capability and resources than a mobile wireless unit. At call origination, page response or registration by the wireless unit, the system can determine the operating category or macrodiversity mode of the wireless unit (fixed, limited fixed or mobile). The macrodiversity control system can determine the mode for the wireless unit by receiving the operating category from the wireless unit and/or by retrieving the operating category and/or macrodiversity mode for the wireless unit from a database accessible to the macrodiversity control system. For example, the current operating category and/or the macrodiversity mode, which is determined or defined by the macrodiversity trigger values, active set threshold values, limited or restricted active set, limited or restricted candidate set and/or the handoff thresholds or parameters can be stored in a database accessible to the MSC 16 of the base station 30, such as the HLR 24 (FIG. 1). The wireless unit operating category and/or macrodiversity mode or parameters thereof can be stored in other databases, such as a stand-alone HLR (SHLR). The operating category and/or macrodiversity mode and parameters thereof can be stored in association with a wireless unit, in association with the operating category and/or in association with the home cell id. The home cell id and/or the operating category can be stored in association with the wireless unit and the corresponding macrodiversity modes and parameters thereof can be stored in association with operating category and/or home cell id.

In some embodiments, the capability of the wireless unit is established at subscription or installation/RF optimization and maintained. In other embodiments, the wireless unit can switch between the fixed, limited fixed and/or mobile modes. For example, the wireless unit could plug into a docking station which includes a wireless network interface unit (NIU), including amplification circuitry, connected to an antenna, such as an antenna on the roof of a house. When engaged with the docking station, the wireless unit can be in the fixed operating category using the fixed macrodiversity mode defined by the fixed macrodiversity trigger values, active set thresholds, active set or candidate set, other parameters and/or by whether handoffs are prevented for the particular fixed wireless unit configuration or for those fixed wireless units in the cell. When engaged with the docking station, the amplification and antenna circuitry in the wireless unit can be bypassed by the network interface unit (NIU) circuitry and antenna connected to the docking station. When the wireless unit is disengaged from the docking station, the wireless unit can use amplification circuitry and the antenna integrated with the wireless unit and switch to a limited fixed operating category by sending a message to the base station. Alternatively, a switch on the wireless unit can change the operating category for the wireless unit. Depending on the embodiment, the macrodiversity control system can be capable of changing the operating category of the wireless unit 40 from fixed (or limited fixed) to mobile, whereby the wireless unit 40 can be handed off between base stations moves between cells.

Alternatively, at system access, the wireless unit can send in a message to the base station a home cell id and/or operating category for the wireless unit. If the home cell id and the base station at which access to the wireless communications system is being requested match, then the wireless unit remains in the fixed (or limited fixed) operating category. Otherwise, depending on the embodiment, the base station can change the operating category for the wireless unit or the wireless unit requests a category change if a home cell id stored in the wireless unit or at the HLR 15 does not match a home cell of the base station at which access to the system is being attempted. For example, in one embodiment, the macrodiversity control system or portion thereof receives at the wireless unit a home cell id of the base station to compare with the home cell id stored at the wireless unit. In ANSI J-STD-008, the Access Parameter Message (APM) sent over the access channel from the base station to the wireless unit can be modified to include a field called the home cell ID. In other embodiments, the wireless unit simply identifies itself (from which the macrodiversity control system obtains the home cell id of the wireless unit) or provides its home cell id to the base station and the home cell id associated with the wireless unit is compared with the home cell id of the base station which the wireless unit is attempting to access. If the home cell id associated with the wireless unit matches the home cell id of the base station being accessed, the operating category can remain as fixed (or limited fixed). If not, the operating category for the wireless unit can be changed to fully mobile.

In response to any change in operating category, the macrodiversity mode for the wireless unit can change. Accordingly, depending on the embodiment, the base station can send corresponding macrodiversity trigger values, active set thresholds, limited, fixed or restricted candidate list, limited, fixed or restricted active set and/or other macrodiversity and handoff parameters or thresholds. Once the mode is changed, different macrodiversity and/or handoff thresholds can be used. Alternatively, if mode changes are not permitted by the wireless system, the call could be dropped. In cellular systems described herein, the charges for the wireless unit 40 can be cheaper when operating in fixed (no mobility) mode or limited fixed (mobility restricted within the home cell) than in mobile mode. The use of macrodiversity modes depending on the operating category, and the corresponding parameters, thresholds, candidate lists, procedures, values and/or other information or macrodiversity/handoff processes, can be used on a wireless unit basis, on a cell-wide basis or on a system wide basis.

Thus, the fixed wireless communications system enables increased capacity in a wireless communications system of fixed, limited fixed and/or mobile units by more efficiently using wireless resources for the wireless system. The fixed wireless system can be used for improving the performance of a stand-alone fixed wireless system or a mixed wireless system having fixed (or limited fixed) wireless units and mobile wireless units.

Figure 3:
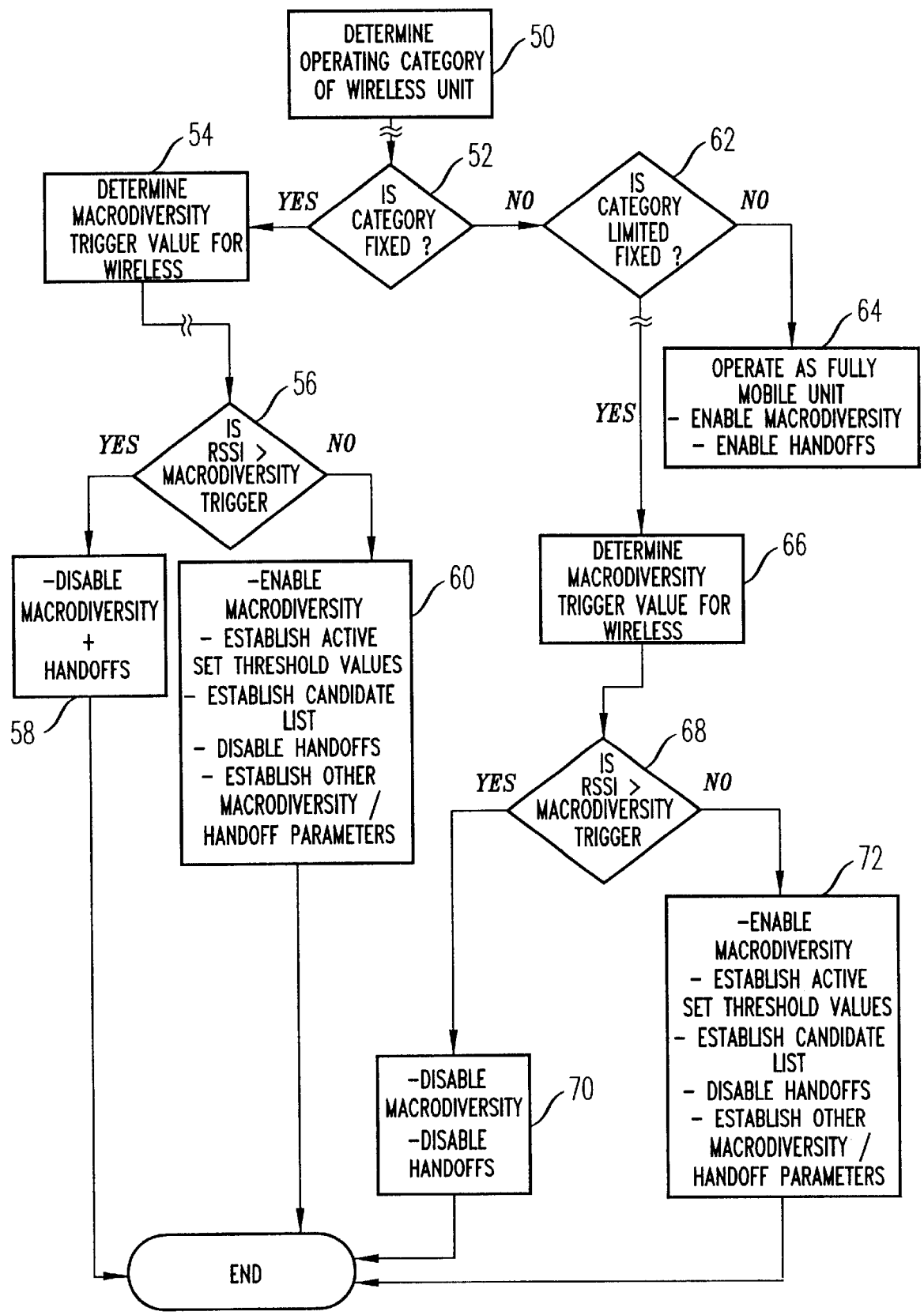
FIG. 3 shows a flow diagram of an embodiment of the macrodiversity control system according to the principles of the present invention.

FIG. 3 shows a flow diagram of an embodiment of the macrodiversity control system depending on the operating categories of fixed, limited fixed or mobile for the wireless unit. More or less operating categories for the wireless units are possible. At block 50, the macrodiversity control system determines the operating category for the wireless unit. The operating category for the wireless unit can be established at subscription or installation and stored at the wireless unit and/or in the wireless communications system in association with the subscriber information of the wireless unit, such as electronic serial number, mobile identification number (MIN or IMSI) and directory or phone number (DN). Additionally, a home cell id can be stored at the HLR 24 (FIG. 1) and/or in the wireless unit. Depending on the embodiment, the macrodiversity control system and portions thereof can be implemented at the wireless unit and/or in the wireless communications system, such as the base station and/or the MSC 16 (FIG. 1)

The macrodiversity control system can be informed of the operating category for the wireless unit (fixed, limited fixed or mobile), for example in a message to the base station and/or a message from the base station to the wireless unit. The operating category (and corresponding macrodiversity/handoff mode parameters) for the wireless unit can be stored in the wireless unit and/or in the wireless communications system, for example in the base station or HLR 24. Depending on the embodiment, the operating category and/or macrodiversity/handoff mode can be maintained until a change in the subscription occurs. Moreover, in some embodiments, the operating category and/or the macrodiversity/handoff mode and the parameters thereof can be updated periodically, dynamically or depending on other operating parameters, such as received signal strength of a channel on the reverse and/or forward links. As such, the macrodiversity control system can determine the operating category and/or macrodiversity mode for the wireless unit at every attempt to access the wireless system by the wireless unit or established initially and maintained. Other embodiments are possible.

At block 52, the macrodiversity control system determines whether the wireless unit is in a fixed operating category. If the wireless unit is operating as a fixed unit, the macrodiversity control system determines macrodiversity trigger values for wireless units operating as fixed or for that particular wireless unit as shown in block 54. The macrodiversity trigger value can be different for each wireless unit or for each operating category. Depending on the macrodiversity mode and/or other parameters related to the home cell, such as traffic load of the cell or surrounding cells, and/or the wireless unit, such as signal quality or speed of the wireless unit, as well as other parameters, the macrodiversity control system can set the macrodiversity trigger levels. After the macrodiverity trigger value is determined, the macrodiversity control system establishes the macrodiversity mode for the wireless unit.

In the embodiment of FIG. 3, the macrodiversity/handoff control system performs a signal quality measurement using for example a received signal strength indicator (RSSI) at the wireless unit. If the macrodiversity trigger is less than the signal strength measurement at block 56, the macrodiversity for the wireless unit is disabled as shown at block 58. Depending on the embodiment, from the system side, transmission to a particular wireless unit can be limited to the serving base station. Macrodiversity can be disabled by restricting the active set to the serving base station, for example by setting active set threshold values or other parameters at RF optimization relative to the home base station. As such, the wireless unit can only communicate with the home base station. If the macrodiversity trigger value is greater than the signal strength measurement at block 56, macrodiversity is enabled. As shown in block 60, active set threshold values for the wireless unit and/or a restrictive or limited set of candidate base stations, for example of certain cells neighboring the home cell, can be established for the wireless unit. With macrodiversity enabled, the wireless unit can receive signals from the base stations on the active sets but will not be handed off from the home base station. As such, handoffs are disabled. The macrodiversity/handoff control system can accomplish this in different ways, for example by preventing the wireless unit from requesting handoffs, ignoring handoff requests and/or setting handoff parameters to achieve desired operation. Depending on the embodiment, the trigger values, active set threshold values and/or handoff parameters can be the same and/or different.

Besides a fixed operating category, the macrodiversity control system can include additional operating categories, such as limited fixed, fully mobile and others, for example categories based on speed. As previously mentioned, the operating category can be established at subscription or installation and maintained or changed, for example from fixed to limited fixed by removing the wireless unit from a fixed docking station or by using a switch on the wireless unit to switch between operating categories. p In any event, if at block 52, the macrodiversity control system determines that the operating category of the wireless unit is not fixed, the macrodiversity control system determines at block 62 whether the operating category of the wireless unit is limited fixed. If not, the wireless unit operates as a fully mobile wireless unit operating for example as described in ANSI J-STD-008 with handoffs and macrodiversity enabled as shown in block 64. Otherwise, if the control system determines that the wireless unit is operating as limited fixed, the control system determines at block 66 the macrodiversity trigger value for the wireless unit. Depending on the embodiment, the macrodiversity trigger value for the limited fixed wireless unit can be the same or different than the macrodiversity trigger value of the fixed wireless unit or of other limited fixed wireless units.

At block 68, the control system compares the limited fixed macrodiversity trigger value with a signal quality measurement using for example a received signal strength indicator (RSSI). If the signal quality measurement at the wireless unit (or at the base station depending on the embodiment) is greater than the macrodiversity trigger value, then the control system disables macrodiversity, thereby disabling handoffs at block 70. Otherwise, macrodiversity is enabled at block 72. Additionally, active set threshold values for the wireless unit and/or a restricted or limited set of candidate base stations, for example of certain cells neighboring the home cell, can be established for the wireless unit. With macrodiversity enabled, the wireless unit can receive signals from the base stations on the active sets but will not be handed off from the home base station. As such, handoffs are disabled. The macrodiversity control system can accomplish this in different ways, for example by preventing the wireless unit from requesting handoffs, ignoring handoff requests and/or setting handoff parameters.

Moreover, depending on the macrodiversity mode for the wireless unit, the wireless system can enable/disable handoffs or set the handoff parameters to different levels. For example, a fixed wireless unit can have no handoff capability or no macrodiversity capability; a limited fixed wireless unit can have no or limited handoff capability or no, limited or full macrodiversity capability; and a mobile wireless unit can have full handoff capability and full macrodiversity capability. Depending on the operating mode and/or parameters, such as signal quality measurements, speed of mobile and/or traffic load of the cell 32 and/or surrounding cells, the macrodiversity and/or handoff parameters defining the macrodiversity mode can be established on a per wireless unit basis and/or on a call by call basis. For example, a limited fixed wireless unit can have limited handoff when the traffic load is light capability which is subsequently switched to no or even more restrictive handoff capability when load is heavier. Furthermore, in some embodiments, the registration procedure is different for wireless units operating in different modes. For example, where fixed (or limited fixed) wireless units do not have handoff capability, registration procedures for those wireless units can be eliminated.

In addition to the embodiment(s) described above, the wireless communications system with a fixed mode according to the principles of the present invention can be used with different cellular systems and configurations which omit and/or add components and/or use variations or portions of the described system. For example, the macrodiversity control system is described with particular reference to a cellular network architecture using ANSI-STD-J-008, but other wireless systems using different multiple access techniques, such as TDMA can be used and systems for sending data and/or voice. It should be understood that different notations, references and characterizations of the various architecture blocks can be used. For example, the wireless system using fixed, limited fixed and/or mobile modes has been described using a particular wireless system, but it should be understood that the system and portions thereof and of the described architecture can be implemented in different locations, such as the wireless unit, the base station and/or the MSC, or in application specific integrated circuits, software-driven processing circuitry, firmware or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A macrodiversity/handoff control apparatus for a wireless communications system including a plurality of base stations and a plurality of wireless units, the control apparatus comprising:

a detector detecting an operating parameter of a wireless unit;

a controller determining an operating mode of the wireless unit; and if the operating mode is fully mobile, the controller permitting macrodiversity and permitting handoffs for the wireless unit;

if the operating mode is non-fully mobile, the controller permitting macrodiversity and restricting handoffs for the wireless unit when the operating parameter is not above a threshold, and the controller restricting macrodiversity and restricting handoffs for the wireless unit when the operating parameter is above a threshold.

2. The apparatus of claim 1, wherein the operating parameter is a signal traffic load on a cell associated with the wireless unit, and/or a signal traffic load on a plurality of surrounding cells associated with the wireless unit.

3. The method of claim 1, wherein the restricting of macrodiversity involves the controller disabling and/or changing macrodiversity parameters of the wireless unit.

4. The apparatus of claim 1, wherein the permitting of macrodiversity involves the controller enabling and/or changing macrodiversity parameters of the wireless unit.

5. The apparatus of claim 1, wherein the restricting of handoffs involves the controller disabling and/or changing handoff parameters of the wireless unit.

6. The apparatus of claim 1, wherein the permitting of handoffs involves the controller enabling and/or changing handoff parameters of the wireless unit.

7. The apparatus of claim 1, wherein the operating parameter is a prior macrodiversity and/or handoff characteristic of the wireless unit.

8. The apparatus of claim 1, wherein the operating mode for the wireless unit may be maintained or changed during wireless communications.

9. The apparatus of claim 1, wherein information regarding the operating mode is stored in the wireless communications system.

10. The apparatus of claim 1, wherein the operating parameter is a signal quality between the wireless unit and a base station.

11. The apparatus of claim 1, wherein the non-fully mobile operating mode refers to the wireless unit being limited fixed or fixed.

12. The apparatus of claim 1, wherein the operating parameter is a prior signal traffic pattern of the wireless unit.

13. The apparatus of claim 1, wherein information regarding the operating mode is stored in the wireless unit.

14. The apparatus of claim 1, wherein the operating mode is established upon wireless unit subscription.

15. The apparatus of claim 1, wherein the operating mode is established upon wireless unit installation.

16. A method of macrodiversity/handoff control in a wireless communications system including a plurality of base stations and a plurality of wireless units, the method comprising:

detecting an operating parameter of a wireless unit;

determining an operating mode of the wireless unit; and if the operating mode is fully mobile, permitting macrodiversity and permitting handoffs for the wireless unit;

if the operating mode is non-fully mobile, permitting macrodiversity and restricting handoffs for the wireless unit when the operating parameter is not above a threshold, and restricting macrodiversity and restricting handoffs for the wireless unit when the operating parameter is above a threshold.

* * * * *